United States Patent [19]

Feuling

[11] Patent Number: 5,549,083
[45] Date of Patent: Aug. 27, 1996

[54] METHOD AND APPARATUS FOR CLEAN COLD STARTING OF INTERNAL COMBUSTION ENGINES

[76] Inventor: James J. Feuling, 2521 Palma, Ventura, Calif. 93003

[21] Appl. No.: 274,342

[22] Filed: Jul. 13, 1994

Related U.S. Application Data

[63] Continuation-in-part of Ser. No. 149,523, Nov. 9, 1993, abandoned.

[51] Int. Cl.[6] .................................................. F02N 17/08
[52] U.S. Cl. .................................. 123/179.5; 123/179.8; 123/525; 123/576; 123/578
[58] Field of Search .......................... 123/179.5, 179.8, 123/525, 575, 576, 578

[56] References Cited

U.S. PATENT DOCUMENTS

| | | | |
|---|---|---|---|
| 3,799,125 | 3/1974 | Hutchinson | 123/576 |
| 4,499,885 | 2/1985 | Weissenbach | 123/578 |
| 4,876,989 | 10/1989 | Karpuk et al. | 123/576 |
| 4,938,180 | 7/1990 | King | 123/179.8 |
| 5,010,870 | 4/1991 | Laskaris et al. | 123/576 |
| 5,184,585 | 2/1993 | Wilson | 123/179.8 |
| 5,228,423 | 7/1993 | Oikawa et al. | 123/575 |
| 5,251,602 | 10/1993 | Kurihara et al. | 123/527 |
| 5,337,722 | 8/1994 | Kurihara et al. | 123/527 |

FOREIGN PATENT DOCUMENTS

| | | | |
|---|---|---|---|
| 2491550 | 4/1982 | France | 123/525 |
| 3222803 | 1/1983 | Germany | 123/525 |
| 0214902 | 10/1984 | Germany | 123/576 |
| 0117055 | 9/1980 | Japan | 123/576 |
| 0176334 | 10/1982 | Japan | 123/525 |
| 8303120 | 9/1983 | WIPO | 123/525 |

*Primary Examiner*—Erick R. Solis
*Attorney, Agent, or Firm*—Frank D. Gilliam; John R. Duncan

[57] ABSTRACT

An improved starting system for internal combustion engines using gaseous fuels such as hydrogen, natural gas, propane, butane and the like. In an engine using liquid fuel injection for normal operation, a sensor for the catalytic converter is provided to sense a "cold converter" condition of the sort which occurs when the engine has not been operated for some time. When starting is initiated, the gasoline introduction system is disabled and introduction of the gaseous fuel in initiated. Rapid engine start promptly occurs, even under very cold ambient conditions. Once the engine has started and has run for a period to warm the catalytic converter to a selected temperature the gaseous fuel introduction system is interrupted and the gasoline system is enabled and provides the fuel thereafter. Catalytic converter temperature is preferably measured at the catalytic material, although measurement of exhaust gas temperature at the converter or downstream thereof is often effective. If desired, gaseous fuel flow may continue for a very short period after liquid fuel flow has begun. This system improves the life of the catalytic converter and the engine, reduces hydrocarbon and carbon monoxide emissions during starting and eliminates the need for special, higher cost, gasoline mixes for winter cold starting.

29 Claims, 1 Drawing Sheet

METHOD AND APPARATUS FOR CLEAN COLD STARTING OF INTERNAL COMBUSTION ENGINES

This is a continuation-in-part of Ser. No. 08/149,523, filed Nov. 9, 1993, now abandoned.

BACKGROUND OF THE INVENTION

This invention relates to the operation of internal combustion engines and, more specifically, to a system for starting and warming internal combustion engines with a gaseous, typically short chain hydrocarbon, fuel.

Emissions of hydrocarbons, carbon monoxide and other gases from internal combustion engines are a major contributor to poor air quality, smog and the like. Great efforts at high cost have been made to reduce such emissions. Among these are the use of catalytic converters to reduce emissions in the exhaust system, computer control of engine operation and special, more costly, gasoline blends. One of the major remaining contributors to engine generated air pollution is the greatly increased hydrocarbon and carbon monoxide levels generated during engine starting and warm-up, especially under cold ambient conditions. Catalytic converters must reach a minimum temperature, generally about 400° F. before they can effectively eliminate pollutants such as unburned hydrocarbons, carbon monoxide, and nitrous oxides. It has been estimated that during a typical 20-minute drive over half of the total undesirable emissions are generated during warm up and that about 70 to 80 percent of total vehicle emissions produced during the Federal Test procedure cycle are emitted within the first two minutes of cold start.

Large amounts of unburned gasoline pass to the exhaust system during the period before catalytic converter warm-up occurs. In very cold conditions the engine may turn over for quite awhile before it "catches" and begins to run. Engines often run roughly when cold, intermittently missing and passing high levels of hydrocarbons and carbon monoxide to the atmosphere during this warm-up period. Air/fuel ratios of one-to-one with liquid fuels at low temperature start-up with very little vaporization are typical. Diverter systems and electrically heated catalytic converters have been suggested to reduce this burst of start-up and warm-up emission. Electrically heated converters and diverters with gas traps add undesirable cost and weight to the system. Electric converter heaters are not fully effective in eliminating undesired emissions during catalytic converter warm up periods since the catalytic converter is not uniformly heated by the proposed electrical heaters. Further, there is a significant time delay between the time an electrical heater is turned on and the catalytic converter is heated to the required temperature. In order to be effective, the driver must turn on the heater and wait until the catalytic converter is heated before starting the engine. In addition, these heaters draw high current and may run the battery down so far as to making starting after the catalytic converter is heated difficult or impossible.

When gasoline is injected into cylinders which do not immediately fire, that gasoline washes oil off of the cylinder walls, reducing lubrication between piston rings and cylinder walls, increasing wear and significantly reducing engine durability. Also, some of the gasoline will bypass the piston rings and contaminate the engine oil, reducing the lubrication efficiency of the oil and requiring more frequent oil changes.

The irregular ignition during starting also reduces spark plug life and increases carbon deposits. The longer starting procedures will increase starter, ring gear and battery wear, again reducing long term engine durability. Under very cold conditions, battery capacity is inherently reduced, so that the battery may not be able to continue to operate the starter if the engine does not start immediately.

A system is described by Wilson in U.S. Pat. No. 5,184,585 for adding a volatile fuel, such as butane or propane, to a liquid fuel, such as gasoline or diesel fuel, when starting an internal combustion engine at low temperatures. While this system will aid in starting under difficult starting conditions, it will do little, if anything, to prevent pollutants from the liquid fuel component, such unburned hydrocarbons, carbon monoxide and the like, from passing through the cold catalytic converter into the environment.

Hutchinson, in U.S. Pat. No. 3,799,125, describes a complex and expensive system for stripping volatile components from gasoline fuel and using those components for starting and warming a gasoline engine. However, the mixture of volatile components will still produce unburned hydrocarbons, carbon monoxide and other undesired components which will pass through the cold catalytic converter and into the environment. Present day gasolines and diesel fuels are carefully formulated blends of many components to produce acceptable performance with reduced pollution. If many short trips are made under low temperature, winter conditions, the remaining liquid fuel in the tank will gradually increase in heavy, less volatile components which are not an efficient fuel in the absence of the normal proportion of the more volatile components. Hutchinson further teaches that it is impractical to use vaporized LPG fuel during the engine warm-up period, typically 2–3 minutes, then switch to liquid fuel.

Thus, there is a continuing need for improvements in starting internal combustion engines, especially in cold conditions, to reduce hydrocarbon and carbon monoxide emissions during the catalytic converter warm-up period, reduce the size and cost of the required catalytic converter, increase engine durability and assure rapid engine starting.

SUMMARY OF THE INVENTION

The above noted problems, and others, are overcome by this invention which, basically provides a method and apparatus for starting a cold internal combustion engine with a gaseous fuel, such as propane, then after the catalytic converter has warmed for a selected period of time and/or reached a selected temperature, terminating the flow of the gaseous starting fuel to the engine and initiating delivery of normal liquid fuel, such as gasoline or diesel fuel.

For the purposes of this application "gaseous fuel" will be understood to include hydrogen and hydrocarbon gases having chain lengths up to about five carbon atoms and mixtures thereof. Typically, gaseous fuels may include hydrogen, natural gas, methane, ethane, propane, butane, pentane and mixtures thereof. Since a relatively small amount of the gaseous fuel is needed in this system, small disposable propane bottles of the sort used in camping lanterns, etc. are particularly desirable because of the ease of replacement and the small size and weight. Liquified natural gas or liquified petroleum gas are undesirable because of the high pressures involved and the required heavy containers.

Liquid fuels may include any fuel that is liquid at normal ambient temperatures, including gasoline, diesel fuel and other similar fuels. These fuels may include a variety of additives and mixtures, such as alcohols, oxygenating compounds and the like. While "gasoline" may be referred to in this application for convenience and clarity of explanation, it should be understood that other similar liquid fuels may be used.

The system preferably includes a sensing means for sensing the temperature of the catalytic converter. Optimally, the temperature sensor may directly measure the temperature of the catalytic converter catalytic material. Alternatively, the temperature of the exhaust gas within the catalytic converter or of the exhaust gas downstream of the catalytic converter may be measured. Under most conditions, the exhaust gas temperature at or beyond the catalytic converter is directly proportional to the temperature of the converter itself.

When a normal engine starting sequence is begun, i.e., turning the ignition key on, activating the starter and beginning ignition in the combustion chambers, the gaseous fuel is introduced into the combustion chambers. As the catalytic converter warms up, it continues to run on the gaseous fuel. Once the selected temperature is reached, in response to the sensed temperature, the introduction of gaseous fuel is interrupted and the introduction of the normal liquid fuel, such as gasoline or diesel fuel, is begun. If desired, a timer may be used, limiting the introduction of gaseous fuel to a very short period, preferably up to about 50 to 70 seconds. Thereafter, the engine operates on the normal fuel.

Ordinarily, fuel is introduced into the combustion chamber either by introducing the fuel into a manifold and directing the fuel from the manifold into the individual combustion chambers or by introducing the fuel charge directly into each intake port or combustion chamber. While other means may be used for introducing fuel into the combustion chambers, fuel introduction using high pressure injectors is preferred. I have found that, because of cost factors and the low air flow at start-up and idle-fast idle, no-load condition, for optimum efficiency in a throttle body type fuel injection system, the gaseous fuel should be injected into the idle air passage.

Alternatively, instead of using a temperature sensor and switching from gaseous to liquid fuel at a selected temperature, a timer may be used to cause the change in fuel after a selected period of time has passed, typically 20 to 60 seconds. This system would have lower cost and would be particularly suitable for use in regions that do not experience extremely low temperatures.

If desired, a temperature sensor sensing the outside, ambient, temperature could be included to increase the timed period under very low temperature conditions. Also, it would be possible to add liquid fuel during the switch-over period just prior to shutting off the gaseous fuel for improved acceleration during cold conditions. Liquid fuel could be caused to begin to flow early where the ECM senses changes in throttle position, changes in vacuum, placing the transmission in gear, etc. which are indicative of a need for early power application.

This sequence overcomes the problems noted above. Accordingly, it is an object of this invention to provide a starting system that reduces emissions of hydrocarbons, carbon monoxide and other agents into the atmosphere during cold catalytic converter warm up by assuring that the catalytic converter is warmed up and operating prior to burning liquid fuel in the engine. Another object of the invention is to improve engine durability by eliminating the wash-down of oil from cylinder which causes increased wear between pistons and piston rings and the cylinder walls. A further object of this invention is to reduce the required size, and increase the life, of catalytic converters by eliminating the discharge of unburned liquid fuel and/or oil into the converter during engine starting. Yet another object of this invention is to improve engine starting during very cold weather. Still a further object of this invention is to eliminate the need for special, higher cost, gasoline mixtures and additives necessary for starting of liquid fueled engines in very cold weather. Another object of this invention is to reduce carbon deposits in the combustion chambers and on spark plugs during the initial stages of engine starting. Yet another object of this invention is to reduce spark plug fouling during engine initial start-up.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
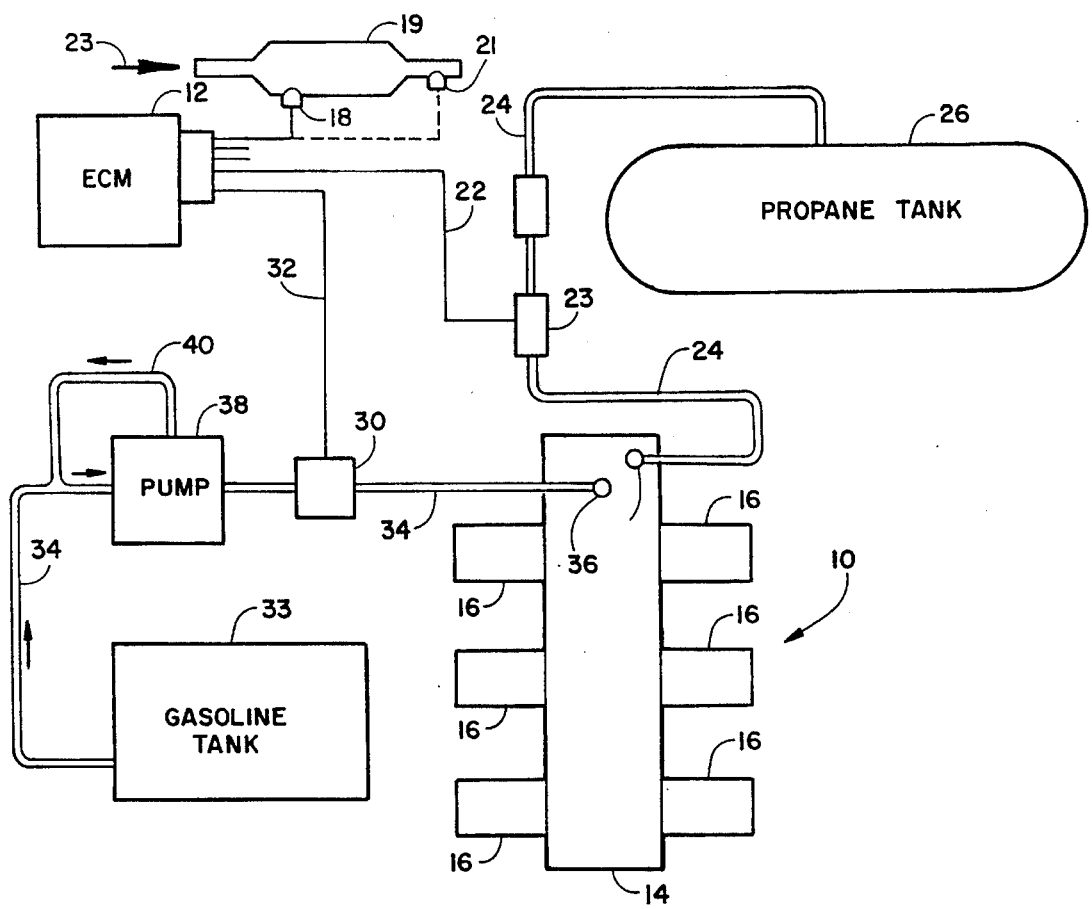
FIG. 1 is a schematic diagram of the fuel delivery system of this invention using a single manifold introduction system.

FIG. 1 shows a schematic block diagram of an internal combustion engine 10, a control module 12 and a fuel supply system. Engine 10 may be any internal combustion engine that uses a liquid hydrocarbon fuel, such as gasoline or diesel fuel. Module 12 may be any convention electronic control device or group of devices that can meet the requirements of the starting system of this invention. Typically, an Electronic Control Module (ECM) of the type provided with modern automobiles, trucks and the like can be easily programmed to meet these requirements. Of course, if desired, individual sensors and control devices can be assembled to perform the required functions.

Engine 10 in the embodiment of FIG. 1 has a central throttle body 14 into which fuel is introduced, mixed with air and directed to individual combustion chambers 16, typically six as shown here. For optimum results, the gaseous fuel is injected into the idle air passage of conventional throttle body 14 while the liquid fuel is injected using the normal injector.

A temperature sensor 18 senses the internal temperature of the catalytic material within catalytic converter 19 and sends a corresponding signal through wire 20 to control module 12. Alternately, a temperature sensor 21 may be used, positioned downstream of exhaust gas flow through catalytic converter 19 as indicated by exhaust gas flow arrow 23.

If the temperature is below a selected temperature set in the control module, a signal will be passed through wire 22 to a valve 23, typically a solenoid valve, to open the valve and allow a gaseous fuel to pass from gaseous fuel tank 26 (preferably containing propane) through pipe 24 to an injector 28 in the idle air passage of throttle body 14 when the normal engine starting sequence (i.e., ignition on, starter cranking is begun). The gas passes through a filter/regulator 30 to assure that clean gas at the proper pressure reaches throttle body 14. If desired, temperature sensor 18 could measure exhaust gas temperature either within the catalytic converter or downstream of the catalytic converter rather than directly measuring temperature of the catalytic converter itself.

If desired, temperature sensor 18 could be eliminated and the ECM could be programmed to switch the fuel delivery system after a pre-programmed period of time, typically about 20 to 60 seconds in accordance with outside temperature or any other suitable parameter. The temperature sensing mode is, however, preferred.

While any suitable gas, such as natural gas, hydrogen, methane, propane, butane etc. may be used, propane is preferred due to the mixing qualities, high heat capacity and ease of compressing to a liquid state. Propane boils/liquifies at −42° C., and the pressure of the vapor above the liquid in the necessarily not completely filled tank is 175.8 psi, so that reasonably light weight tanks of common steel can be used. Liquified natural gas, on the other hand, boils at −161° C. and requires tanks that can withstand a pressure of 2250 psi. Propane is readily available and has a heat content of about 91,000 BTU/gallon, compared to about 60,000 BTU/gallon for liquified natural gas. Butane and ethane may be used, and in some cases may be mixed with propane or other gases.

As the engine runs, the catalytic converter temperature sensed at sensor 18 or 21 will gradually rise until the selected temperature is reached. Generally, this will take about 20 to 60 seconds depending on ambient temperature conditions. At that time, the control module 12 will send a signal to valve 23 to close valve 23 and a simultaneous signal to valve 30 in liquid fuel pipe 32 to open that valve. As mentioned above, if desired, the liquid fuel valve could be opened just before the gaseous fuel valve is closed to allow a blended fuel to be used for a short time to improve acceleration under cold conditions. After the switch-over is complete, only liquid fuel, such as gasoline or diesel fuel, then passes from tank 33 through pipe 34 to the standard injector 36 in throttle body 14.

While that sensed temperature signal could also be used to start fuel pump 38, more rapid response is obtained where pump 38 is in continuous operation from the time starting is begun, with fuel recirculated through pipe 40 until valve 30 opens since this is a very short time, typically 20 to 60 seconds.

Figure 2:
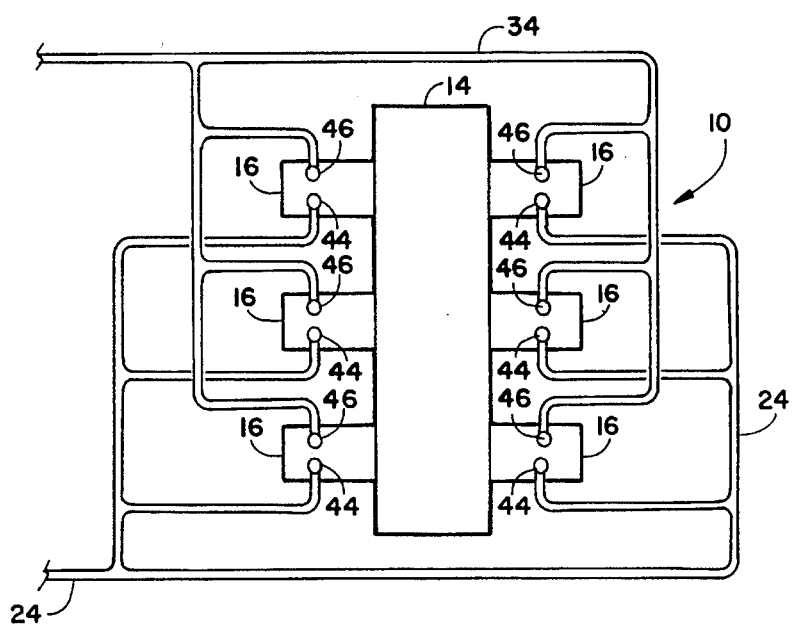
FIG. 2 is a detail schematic diagram showing fuel delivery to injectors at each cylinder.

A detail schematic diagram of an engine 10 in which the fuel is introduced into each combustion chamber 16 is shown in FIG. 2. Gaseous fuel is directed through pipes 24 to individual injectors 44 at each combustion chamber 16. Similarly, individual injectors 46 are provided to introduce liquid fuel into each combustion chamber 16. The balance of the system is as seen in FIG. 1, including the control system for selecting which set of injectors is operating at a specific time.

Any suitable control system may be used. An electronic control module of the sort that controls many operations of modern vehicles is preferred. Such modules can be easily programmed to control the sequence described above. If desired, separate sensors and control circuits could be used. The system could even be controlled manually, with a driver watching a temperature gauge and flipping a switch to close valve 23 and open valve 30. However, a manual system is undesirable since it will not perform as accurately as the automatic system and sometimes might not be used, giving up the benefits of the starting system of this invention.

Under extremely cold conditions, in a gasoline engine, it is preferred that ECM 12 be programmed to retard the spark slightly to increase the rate of exhaust heat up, which will cause catalytic converter 19 to reach the selected temperature more rapidly. Also, ECM 12 could usefully be programmed to increase engine idle speed somewhat under such extremely cold conditions to further increase heat output and shorten the catalytic converter heat up time.

Other applications, variations and ramifications of this invention will occur to those skilled in the art upon reading this disclosure. Those are intended to be included within the scope of this invention, as defined in the appended claims.

I claim:

1. An improved starting system for internal combustion engines which comprises:

temperature sensing means for sensing the temperature of a catalytic converter in the exhaust system of an internal combustion engine;

starting means for starting said interval combustion engine including means for igniting fuel in combustion chambers;

means for introducing a gaseous fuel into said combustion chambers when the sensed temperature is below a predetermined temperature;

means for interrupting the flow of said gaseous fuel to said combustion chambers when a temperature at or above said predetermined temperature is sensed;

means for introducing liquid fuel into the combustion chambers when a temperature at or above said predetermined temperature is sensed; and means for preventing introduction of liquid fuel into the combustion chambers when a temperature below said predetermined temperature is sensed.

2. The improved starting system according to claim 1 wherein said temperature sensing means is located at said catalytic converter and measures the temperature of the converter.

3. The improved starting system according to claim 1 wherein said temperature sensing means is located at said catalytic converter and measures the temperature of exhaust gases in the catalytic converter.

4. The improved starting system according to claim 1 wherein said temperature sensing means is located downstream of said catalytic converter to measure exhaust gas temperature beyond said catalytic converter.

5. The improved starting system according to claim 1 wherein said gaseous fuel is propane.

6. The improved starting system according to claim 1 wherein said liquid fuel is selected from the group consisting of gasoline and diesel fuel.

7. The improved starting system according to claim 1 wherein said means for introducing said gaseous fuel includes a replaceable tank containing liquified gaseous fuel.

8. The improved starting system according to claim 1 wherein said means for introducing gaseous fuel and means for introducing liquid fuel each introduces fuel into a throttle body from which fuel is directed to each combustion chamber.

9. The improved starting system according to claim 8 wherein said gaseous fuel is introduced into the throttle body idle air passage.

10. The improved starting system according to claim 1 wherein said means for introducing gaseous fuel and means for introducing liquid fuel each includes means for introducing fuel directly into each combustion chamber.

11. The improved starting system according to claim 1 wherein said ignition means further includes means for retarding ignition system spark during starting in cold conditions.

12. The improved starting system according to claim 1 further including means for increasing engine cold idle speed during starting in cold conditions.

13. The improved starting system according to claim 1 further including means for selectively beginning introduction of said liquid fuel slightly before interruption of flow of said gaseous fuel flow in response to sensed acceleration of said engine.

14. An improved starting system for internal combustion engines which comprises:
   temperature sensing means for sensing the temperature of a catalytic converter in the exhaust system of said internal combustion engine;
   fuel injection means for introducing fuel into said combustion chambers;
   starting means for said interval combustion engine including means for igniting fuel in combustion chambers;
   means for introducing a gaseous fuel into an idle air passage of said fuel injection means when the sensed temperature is below a predetermined temperature;
   means for interrupting the flow of said gaseous fuel to said throttle body fuel injection means when a temperature at or above said predetermined temperature is sensed at said catalytic converter;
   means for introducing liquid fuel into the combustion chambers when a temperature at or above said predetermined temperature is sensed; and
   means for preventing introduction of liquid fuel into the throttle body fuel injection means when a temperature below said predetermined temperature is sensed.

15. The improved starting system according to claim 14 wherein said gaseous fuel is propane and said liquid fuel is selected from the group consisting of gasoline and diesel fuel.

16. The improved starting system according to claim 14 wherein said means for introducing said gaseous fuel includes a replaceable tank containing liquified gaseous fuel.

17. The improved starting system according to claim 14 wherein said ignition means further includes means for retarding ignition system spark during starting in cold conditions.

18. The improved starting system according to claim 14 further including means for increasing engine cold idle speed during starting in cold conditions.

19. The improved method of starting internal combustion engines which comprises the steps of:
   sensing the internal temperature of a catalytic converter in the exhaust system of an internal combustion engine which includes a catalytic converter in the exhaust system;
   activating a conventional engine starting sequence, including providing ignition for fuel in engine combustion chambers;
   introducing a gaseous fuel into said combustion chambers when the sensed temperature is below a predetermined temperature;
   continue operating said engine until the sensed exhaust system temperature reaches said predetermined temperature;
   interrupting flow of said gaseous fuel to said combustion chambers; and
   initiating introduction of liquid fuel to said combustion chambers.

20. The method according to claim 19 wherein said exhaust system temperature is measured by measuring the temperature of the catalytic converter.

21. The method according to claim 19 wherein said exhaust system temperature is measured by measuring the temperature of exhaust gases in said catalytic converter.

22. The method according to claim 19 wherein said exhaust system temperature is measured by measuring the temperature of exhaust gases beyond said catalytic converter.

23. The method according to claim 19 wherein said gaseous fuel is propane and said liquid fuel is selected from the group consisting of gasoline and diesel fuel.

24. The method according to claim 19 wherein said gaseous fuel and said liquid fuel are each introduced into a throttle body and directed from said throttle body to each combustion chamber.

25. The method according to claim 24 wherein said gaseous fuel is introduced into an idle air passage in said throttle body.

26. The method according to claim 19 wherein said gaseous fuel and said liquid fuel are each introduced directly into each combustion chamber.

27. The method according to claim 19 further including timing the period from initiation of the starting sequence and causing the change from gaseous to liquid fuel upon expiration of a selected time period.

28. The method according to claim 27 wherein said selected time period is from about 50 to 70 seconds.

29. The method according to claim 19 further including beginning introduction of said liquid fuel before introduction of gaseous fuel is interrupted in response to a sensed need for early engine acceleration.

* * * * *